United States Patent [19]
Keilert et al.

[11] Patent Number: 5,441,394
[45] Date of Patent: Aug. 15, 1995

[54] DEVICE FOR COOLING AND GRANULATING MOLTEN THERMOPLASTIC STRANDS EMERGING FROM DIES

[75] Inventors: Jurgen Keilert, Kleinwallstadt; Frank Glockner, Aschaffenburg; Helmut Meidhof; Laurenz Hohm, both of Grossostheim, all of Germany

[73] Assignee: Rieter Automatik GmbH, Germany

[21] Appl. No.: 146,174

[22] PCT Filed: Mar. 10, 1993

[86] PCT No.: PCT/EP93/00542

§ 371 Date: Apr. 1, 1994

§ 102(e) Date: Apr. 1, 1994

[87] PCT Pub. No.: WO93/17850

PCT Pub. Date: Sep. 16, 1993

[30] Foreign Application Priority Data

Mar. 12, 1992 [DE] Germany .............. 42 07 944.6

[51] Int. Cl.⁶ .............................................. B29C 47/88
[52] U.S. Cl. ...................... 425/71; 264/178 F; 425/301; 425/308
[58] Field of Search ............... 425/69, 71, 301, 308, 425/315, 215; 264/178 F, 178 R, 175, 216

[56] References Cited

U.S. PATENT DOCUMENTS

| | | | |
|---|---|---|---|
| 2,838,800 | 6/1958 | Hertz | 264/178 R |
| 3,518,722 | 7/1970 | Ryan et al. | 425/71 |
| 3,837,781 | 9/1974 | Lambertus | 425/308 |
| 3,942,933 | 3/1976 | Svendsen | 425/326.1 |
| 4,528,157 | 7/1985 | Lettner et al. | 425/69 |

FOREIGN PATENT DOCUMENTS

| | | |
|---|---|---|
| 575256 | 5/1976 | China . |
| 086400 | 8/1983 | European Pat. Off. . |
| 1176346 | 8/1964 | Germany . |
| 1295176 | 5/1969 | Germany . |
| 1916222 | 11/1970 | Germany . |
| 2103698 | 8/1972 | Germany . |
| 2230187 | 10/1974 | Germany . |

OTHER PUBLICATIONS

Patent Abstracts of Japan, vol. II, No. 71 (M-567) 2518, 4 Mar. 1987 & JP, A, 61 227 014 (Mitsubishi Metal Corp.) 9 Oct. 1986, see Abstract.

*Primary Examiner*—James P. Mackey
*Attorney, Agent, or Firm*—Banner & Allegretti

[57] ABSTRACT

A device for cooling and granulating molten thermoplastic strands (1) emerging from dies (2) which either drop along the falling line starting at the dies or are guided in an operating position through a coolant bath (9), freely stressed between guide rollers fitted in the bath and then taken into a granulator (4). In the region between the dies and the coolant bath there is a precooling device (5) which carries the plastic strands emerging from the dies and takes them to the coolant bath. Behind the precooling device there is a gripping device (21) with opposed clamping rollers (41, 42) which can open and shut and move along a guiding rail to grip the forward ends of the plastic strands after they have been separated by a separator (22) movable through the falling line of the strands. The rollers with the forward ends of the strands are moved along the guiding rail running through the region of the coolant bath as far as the granulator, where they release the strands thereinto.

8 Claims, 4 Drawing Sheets

DEVICE FOR COOLING AND GRANULATING MOLTEN THERMOPLASTIC STRANDS EMERGING FROM DIES

BACKGROUND OF THE INVENTION

The invention relates to a device for cooling and granulating molten thermoplastic strands, which emerge from dies and which either drop along the falling line starting at the dies or are guided in an operating position through a coolant bath, freely stressed between guide rollers, arranged in said bath and then are fed into granulator, where a precooling device, which carries the strands emerging from the dies and takes them to the coolant bath, is arranged in the region between the dies and the coolant bath.

Such a device is known from the DE-PS 11 76 346. In this device between the dies and the coolant bath there are cooling rollers, into which the strands coming from the dies have to be threaded, in order to be guided thereafter through the coolant bath. In the coolant bath the strands travel through two pairs of deflecting rollers, which provide that the strands are guided reliably through the coolant bath. After leaving the coolant bath, the strands are then carried by a revolving conveyor belt, in order to then travel into the inlet of the granulator. In this device the strands must be threaded by hand, as customary with the use of such coolant baths, in the region between the dies and the granulator into the organs guiding and carrying the strands. This work is not only time-consuming, but it is also a dangerous operation, since the responsible personnel for monitoring such a device must reach into the hot strands. This is difficult, above all, when a larger number of strands, e.g. 50 strands and more, has been produced due to the width of the space that the strands occupy. At every startup of the device one has to wait until a qualitatively perfect material emerges from the dies, a state which, according to experience, takes some time following startup, during which the strands are guided first along their falling line next to the device into a waste container. If the operating personnel determines the quality of the emerging strands to be flawless, then a knife-like tool has to be slid by hand over the dies, in order to produce a break in the strands, after which then the newly emerging strands are guided into the coolant bath. The more strands issue from the dies, the more difficult this operation is, so that with this manual manipulation only one portion of the dies can be stripped off in the described manner, so that the strands emerging from the other dies continue to fall into the waste container.

In addition, a device for cooling molten thermoplastic strands emerging from dies is known from the DE-AS 22 30 187; in said device the strands are guided to a pair of conveyor belts, by means of which the strands and the conveyor belts are guided in a meandering guide through a coolant bath.

Furthermore, it is known from the DE-AS 12 95 176 to cool the strands emerging from the dies in a coolant bath, in which the strands are caught by a collecting pan, before the strands are fed into a granulator. The collecting pan is slid along a slideway, whereby the strands are supposed to catch apparently in an intercepting slot of the collecting pan. They are taken along by the displaced collecting pan and thus pulled out of the coolant until they get to the granulator. To thread the granulator, the strands are cut off upstream of the collecting pan, so that a quantity of plastic, guided beforehand into the collecting pan, remains first in said pan and has to be removed for the next working step.

The invention is based on the problem of automating the threading operation of the strands in such a manner that it is ensured that the entire number of delivered strands can always enter with their forward ends simultaneously into the granulator.

This problem is solved according to the invention by disposing behind the precooling device for a clamping grasp of the forward ends of the strands a gripping device, which guides the forward ends of the strands—after the strands have been jointly separated by means of a separator moveable through the falling line of the strands—along a guiding rail running through the region of the coolant bath as far as the granulator.

The gripping device is always offered in this manner the forward ends of the strands that are produced after separating the strands by means of the moveable separator, so that the forward ends of the strands are subsequently threaded by means of the gripping device moved along the guiding rail virtually without mutually offsetting the forward ends of the strands in the longitudinal direction. Thus, the gripping device guided along the guiding rail can reliably grasp the forward ends of the strands, which are cut by the separator and from which every opportunity has been taken in the gripping device to stick to the neighboring strands. Thus, the forward ends of a flawless material reach in essence simultaneously the granulator, so that said granulator can immediately cut the strands into pellets of high value quality. In contrast, when a larger number of strands are threaded by hand, the forward ends of the strands always form lumps, after which the strands continue to flow in more or less stuck together for some time. The granulator cannot cut perfect pellets from this mass of delivered material, since pellets can be cut only from clean single strands. The gripping device is provided expediently with opposed clamping rollers to grip the forward ends of the strands, since said gripping device can also exert a feeding motion on the strands.

The guiding rail and thus the gripping device can be guided as far as immediately in front of the granulator, from where then the strands can travel directly into the inlet of the granulator. However, it is also possible to let the guiding rail terminate in an end position, in which the rollers are set into motion in the sense of a feed motion, until the strands are grasped by the granulator. This kind of feed of the strands to the granulator has the advantage that it is not necessary to bring the gripping device close up to the granulator, a feature that in the case of irregularities in the position of the individual strands in the gripping device could lead to single strands not being grasped at all by the granulator. If, however, the gripping device with its rollers can feed the strands into the granulator from a specific distance up stream of the granulator, and in particular due to the corresponding rotation of the rollers, then this method of operating the gripping device guarantees that in the final analysis all of the strands can also be grasped reliably by the granulator.

With precooling the goal of designing the precooling device as a discharge channel, which is fed with the coolant and which is arranged underneath the dies to catch the strands, can be achieved. This discharge channel is a simple component, which can be accessed from the top and on which the strands falling from the dies are automatically oriented subject to the influence of the coolant stream flowing over the discharge channel. In the region of the discharge channel the strands are adequately cooled, in order to be then grasped as forward ends by the gripping device without any significant deformation.

The discharge channel can be combined in a manner that makes sense from a technological point of view with the separator, namely by rendering the discharge channel moveable along a carriage guide and by assigning to it the separator, which while moving the front side of the discharge channel grasps and separates the strands through the falling line of the strands into the operating position.

With such a moveable discharge channel it can be achieved that in its external operating position said discharge channel lets the strands in the falling line fall into a waste container, a process that is necessary, as explained above, during startup of the system, whereupon then when the strands of flawless material emerge, the discharge channel can be slid with its front side through the falling line of the strands, whereby the separator allocated to it grasps and jointly separates the strands. It should also be pointed out that such a relatively short discharge channel with a separator interacting with another discharge channel is known from the DE-PS 32 05 052.

The guiding rail runs expediently through the coolant bath and around the guide rollers, so that if the gripping device runs in an analogous manner, the strands grasped by said gripping device are guided through the coolant bath and thus also around the guide rollers, thus completing the automatic threading operation. At the same time, however, the guiding rail must run through corresponding curves in the region of the inlet and the outlet to the coolant bath. However, it is also possible to design the guiding rail in essence linearly. To this end, the guide rollers can be moved in such a manner that they can be lifted out of the coolant bath and lowered into said bath, and that the guiding rail runs between coolant bath and the elevated position of the guide rollers, whereby upon reaching the end position the guide rollers are moved into the lowered position by means of the gripping device.

In the design of the guiding rail, the strands are first moved freely suspended over the coolant bath, whereupon the previously elevated guide rollers, below which the guiding rail runs, are lowered, whereby they dip the strands into the coolant bath. Then the strands continue to run around the guide rollers through the coolant bath.

BRIEF DESCRIPTION OF THE DRAWINGS

Embodiments of the invention are shown in the drawings.

FIG. 2 is a top view of the device according to FIG. 1a.

DETAILED DESCRIPTION OF THE PREFERRED EMBODIMENTS

Figures 1A, 1B:
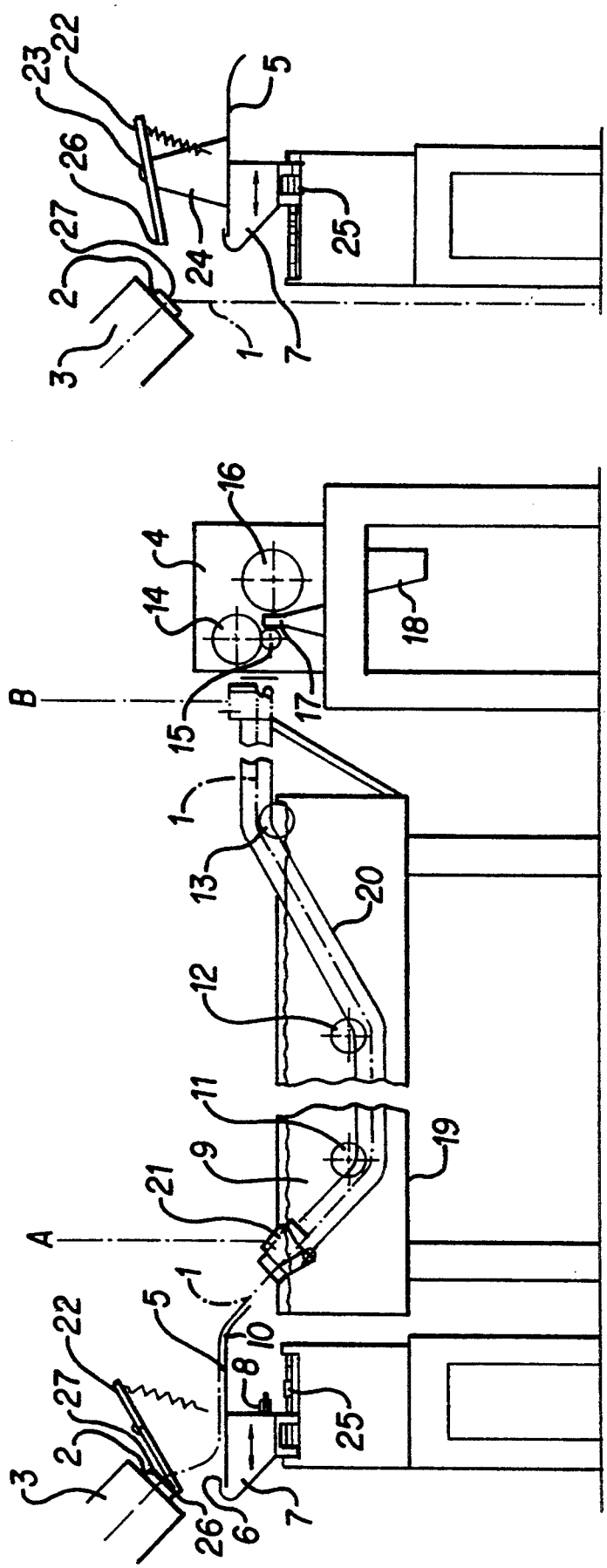
FIGS. 1a and b are side views of the device—and in particular in FIG. 1a depicted in the operating position in which the strands travel into the granulator, and in FIG. 1b depicted in the startup position, in which the strands first fall from the dies along the falling line.

The device shown in FIG. 1 receives the strands 1 from the die head 3, which exits the dies 2 and from which the strands 1 emerge in the molten state. In the operating position, which is shown in FIG. 1a and in which the strands 1 enter into the granulator 4, the strands 1 fall on the precooling device, which is designed as a discharge channel 5 and on whose left end an overflow 6 is disposed for the entry of cooling water, which flows from the water tank 7 into the overflow 6. The water tank 7 receives the cooling water by way of the inlet port 8. The cooling water flowing through the overflow 6 guides the strands 1 over the discharge channel 5 into the coolant bath 9. The required deflection of the strands 1 from the horizontally arranged discharge channel 5 into the sloped direction of the subsequent course of the strands 1 into the coolant bath 9 is accomplished by means of a rounding off 10 at the end of the discharge channel 5. The strands 1 are deflected by means of the guide rollers 11 and 12 in the coolant bath 9 and subsequently guided out of the coolant bath 9 by means of the deflecting roller 13. After the deflection of the strands 1 around the deflecting roller 13 the strands 1 travel directly into the granulator 4. Here a standard design is shown as the granulator, which contains the two feed rollers 14 and 15 and the rotor 16 with the stationary knife 17. The pellets cut off from the supplied strands 1 by means of the rotor 16 fall through the outlet chute 18 from the granulator 4 for further processing or use.

In the device illustrated the strands 1 are cooled in two steps, namely first by means of the discharge channel 5, which serves as the precooling device and on which the strands are cooled to the point they are at least externally solidified. Along its additional run through the coolant bath 9 the strands 1 are then cooled to the point that they can be pelletized in the customary manner by means of the granulator 4. The coolant bath 9 is the vat 19, in which is located the water as coolant, whose temperature is set in such a manner that the degree of cooling the strands 1 that is necessary for subsequently pelletizing is obtained.

The device shown in FIG. 1a exhibits for the automatic threading of the forward ends of the strands 1 the guiding rail 20, which serves to guide the gripping device 21, which can run by itself from position A, shown by the dash-dotted line, into position B. While the guiding rail 20 travels from position A into position B, the gripping device 21 takes the forward ends of the strands that it has grasped along the guiding rail 20, whereby the strands taken along by the gripping device 21 loop around the two guide rollers 11 and 12 in the position shown in FIG. 1a and are deflected by the deflecting roller 13, until they arrive finally directly upstream of the inlet of the granulator 4.

The gripping device 21 grasps the forward ends of the strands fed to it in the manner explained in detail in connection with FIGS. 4 and 5. To feed at this stage altogether the strands 1, which emerge from the die head 3 and which at the instant they are grasped by the gripping device 21 lie along the dash-dotted line D in FIG. 2 (reference numeral 28), to the gripping device 21, there is a separator 22 that in FIG. 1a is shown in a position in which it is located after complete separation of the strands 1.

The shape and function of the separator 22 are explained in detail in the following.

FIG. 1b shows the separator 22 in its position prior to separating the strands 1. The separator 22 is designed as a lever, which is mounted on the axis of rotation 23. The axis of rotation 23 is attached to the support 24, which is mounted on the discharge channel 5. The discharge channel 5 and the water tank 7 can be moved back and forth in the horizontal direction by means of the carriage guide 25. In the drawing according to FIG. 1b the separator 22 and the related components are in the right displacement position of the carriage guide 25, in which the strands 1 emerge from the dies 2 as waste and fall downward along their falling line, e.g. into an arbitrary waste container (not illustrated). At the same time it involves the starting-up position, in which after putting the die head 3 into operation first degraded material emerges that cannot travel into the device, shown in FIG. 1a, because it falls along the falling line.

If it is then determined that material whose quality is perfect is emerging from the dies 2, the water tank with the discharge channel 5 and thus the separator 22 are moved to the left, thus taking the separator 22 over the support 24. The left end of the separator 22 has a knife 26, which during this movement appears on the surface 27 of the dies 2, combined into a set of dies, and slides over the surface 27 as the carriage guide 25 continues to move along its course until the knife 26 arrives in the position shown in FIGS. 1a. On this path the knife 26 cuts the strands, emerging from the dies 2, so that the forward ends of the strands emerging from the dies at this stage (see reference numeral 28 in FIG. 2) travel on the discharge channel 5 and are advanced over said discharge channel with its rounding off 10 in the direction of the gripping device 21. This is accomplished by means of the coolant, which flows out of the overflow 6 and which floods the forward ends 28 of the strands uniformly over the discharge channel 5 in the direction of the coolant bath 9.

The separating operation of the strands and their collection by the discharge channel 5 are described in detail in the aforementioned DE-PS 32 05 052.

By means of this well-known measure of separating the strands 1, forward ends 28 of strands (see FIG. 2) that lie on the same level are produced in the direction of movement of the strands, a feature that is utilized to feed to the gripping device 21 forward ends that can be grasped all at once and that are grasped almost immediately behind their cut point (see FIG. 2), without any larger lengths of strands that could have a negative effect on the above described threading operation of the strands existing in front of the grasping point.

Figure 2:
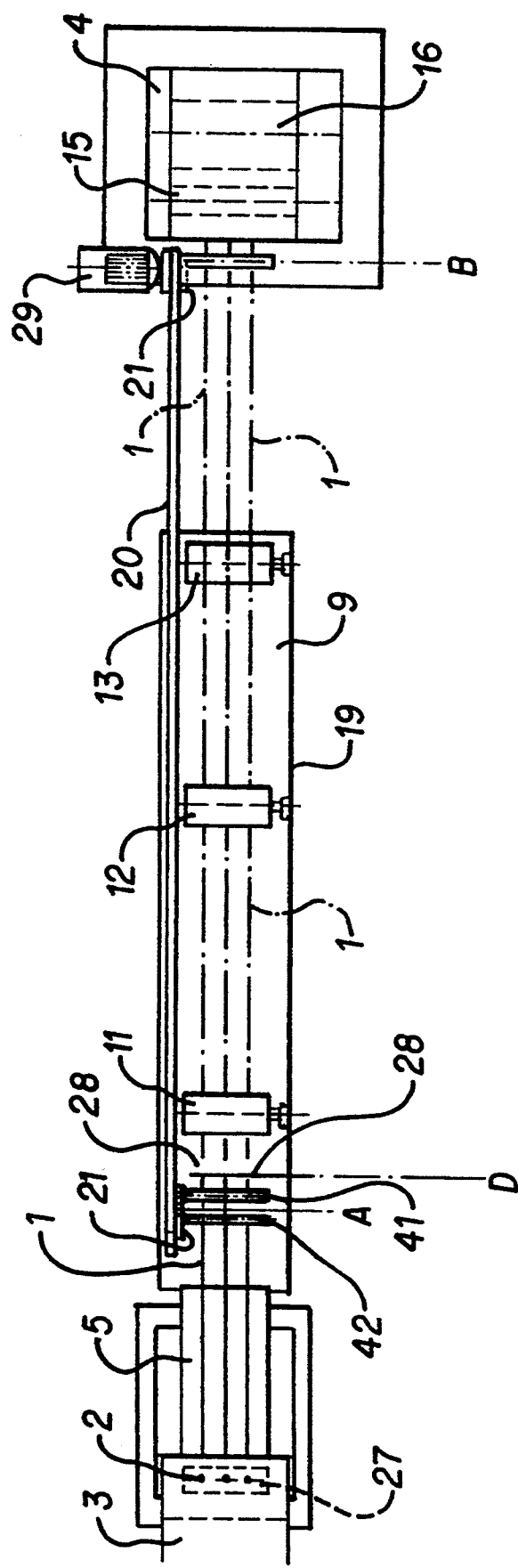

FIG. 2 is a top view of the device according to FIG. 1a, wherein in the region of the discharge channel the separator 22 with its other components is omitted for reasons owing to a better overview. Shown are three strands 1 that lie side-by-side and that run from the discharge channel 5 through the gripping device 21 into the coolant bath 9 and into the granulator 4. It must be pointed out that normally with such a device a significantly larger number of strands that lie side-by-side are processed, e.g. 50 and more strands, so that the total number of strands 1 extend over a relatively wide area, in which then the forward ends 28 of the strands have to be grasped simultaneously by the gripping device 21.

FIG. 2 also shows the drive motor 29, which serves for the movement of a drive member, which runs in the guiding rail 20, for example a chain, by means of which the gripping device 21 is moved out of position A into position B and back.

Figure 3:
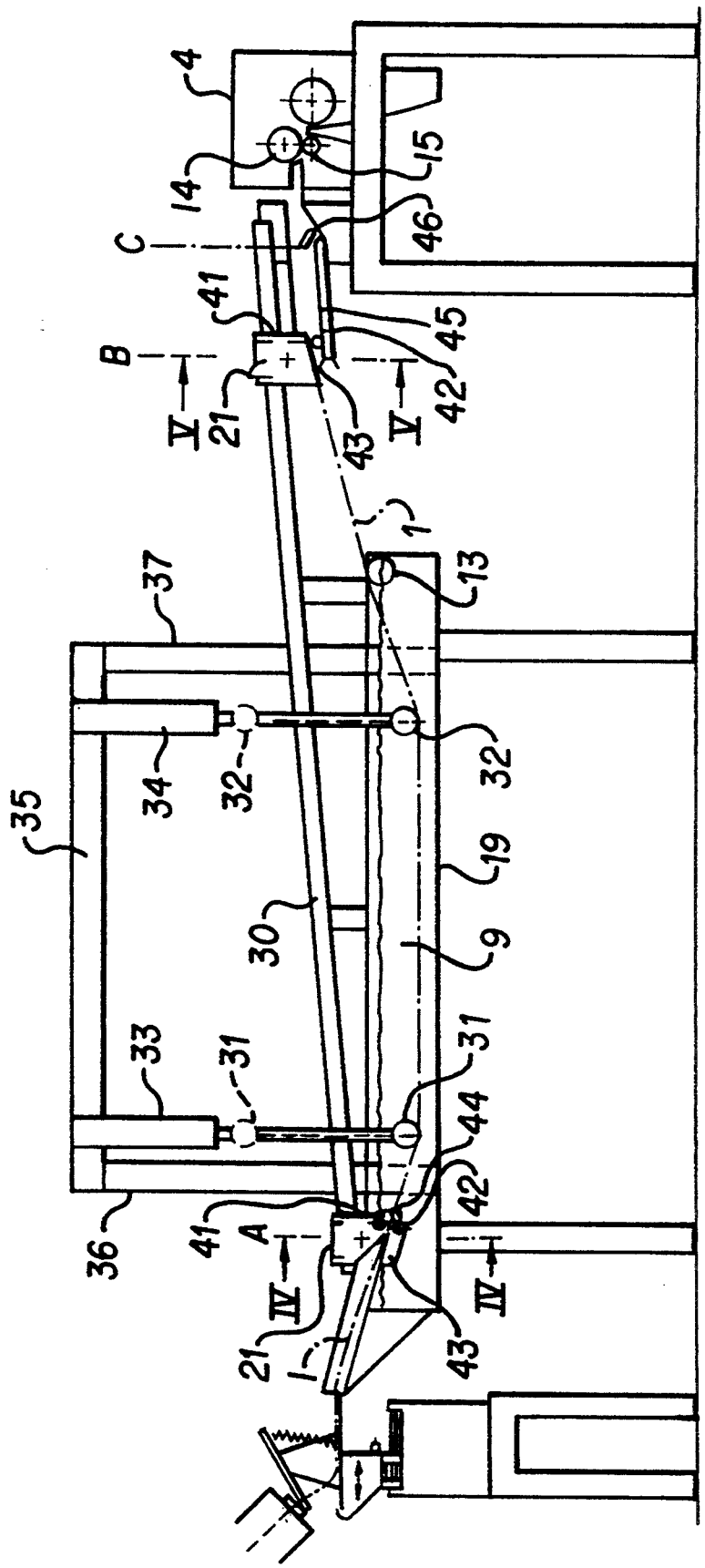
FIG. 3 depicts a modification of the device according to FIG. 1 with the guiding rail running above the coolant bath.

FIG. 3 shows a modification of the design of the device according to FIGS. 1 and 2. This modification consists of the guiding rail 30 extending linearly, and in particular above the coolant bath 9, so that, while the gripping device 21 is traveling from position A into position B, the strands 1, which sag slightly, are pulled first above the vat 19. To enable this guiding of the strands 1 that occurs first, the guide rollers 31 and 32 (corresponding to guide rollers 11 and 12 according to FIG. 1) can be lifted out of the coolant bath, as shown by means of the dash-dotted position of the guide rollers 31 and 32. The guide rollers 31 and 32 hang on hydraulically operated feeders 33 and 34, which are suspended from the support 35. The support 35 is mounted on pillars 36 and 37.

To move the gripping device 21 out of position A into position B, the guide rollers 31 and 32 are moved into the elevated position, shown by the dash-dotted line, so that the requisite space for the strands 1 moved by the gripping device 21 is available. After the gripping device 21 has reached position B, the guide rollers 31 and 32 are lowered into the coolant bath 9, whereby the strands 1 are also dipped into the coolant bath 9, whereupon during the further course of processing the strands 1 the deflecting rollers 31 and 32 guide the strands 1 in the same manner as explained above in connection with FIG. 1.

With respect to the other function of the components of the device according to FIG. 3, reference is made to the explanations for FIGS. 1a and b.

Figure 5:
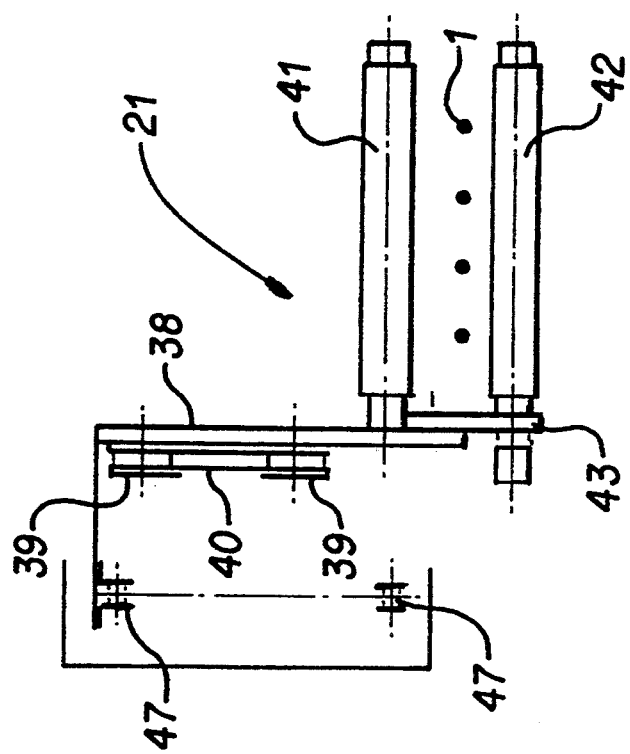
FIG. 5 depicts the gripping device in the opened position.
Figure 4:
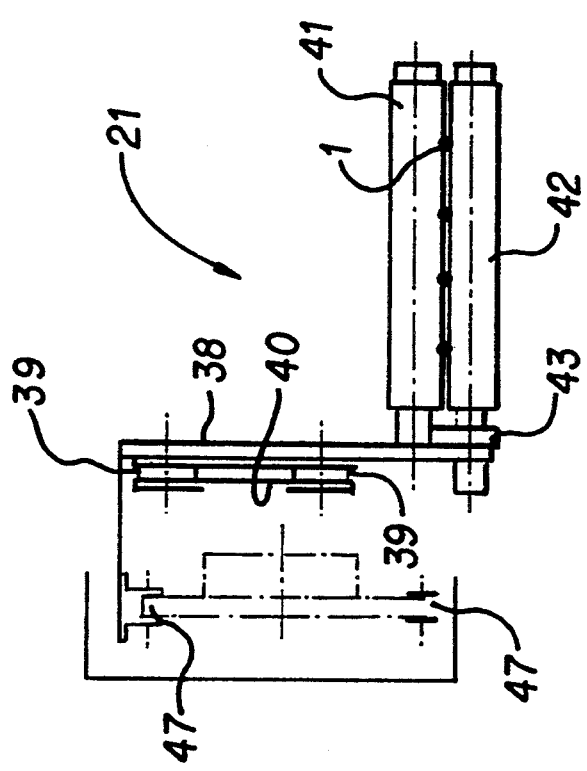
FIG. 4 depicts the gripping device in the closed position.

FIGS. 4 and 5 are described next to explain the function of the gripping device 21.

According to FIG. 4, which is a sectional view along line IV—IV from FIG. 3, the gripping device 21 comprises an angle support 38, to which the two guide rollers 39 are attached that envelop a track 40 attached in the guiding rail 30 and thus give the gripping device 21 a reliable mounting with moveability in the longitudinal direction of the guiding rail 30. Furthermore, two clamping rollers 41 and 42 are attached to the angle support 38; of said clamping rollers the clamping roller 42 can be moved into the clamping position shown in FIG. 4 or into the open position shown in FIG. 5. To this end, the clamping roller 42 sits on the arm 43, which is swivel-mounted on the angle support 38 and which, as FIG. 3 shows, moves by means of its swiveling relative to the angle support 38 the clamping roller 42 either away from the clamping roller 41 (see FIG. 5) and pushes it in the direction of the clamping roller 41 (see FIG. 4). Moreover, the simultaneous guiding of both clamping rollers 41 and 42 into the clamping position shown in FIG. 4 can be facilitated by means of a suitable spring, which pulls together the two clamping rollers 41 and 42. The two clamping rollers 41 and 42 are opened, according to the drawing in FIG. 5, in position A by means of the cam 44, on which the clamping roller 42 runs up when the gripping device 21 is returned into position A, thus lifting said clamping roller 42 from the clamping roller 41 by means of the arm 43.

When the gripping device 21 is led along the guiding rail 30 to position B, the clamping roller 42 touches down on the carrier track 45, which carries a friction lining that provides that upon further movement of the gripping device 21 in the direction of the granulator 4 the clamping roller 42 is set rotating, and especially with such a direction of rotation that the strands 1, which are clamped between the clamping roller 42 and 41 are advanced. This feeding movement continues until at the end of the carrier rail 45 the clamping roller 42 strikes the cam 46, which, like the cam 44, provides that the clamping roller 42 is lifted from the clamping roller 41, thus releasing the previously clamped strand 1 (position C). The strands 1 are then advanced due to the forced rotation of the clamping roller 42 so far that they move into the granulator 4 and are grasped by the feed rollers 14 and 15.

FIGS. 4 and 5 also show the chain 47, which runs in the guiding rail 30 and which is driven by the drive motor 29 shown in FIG. 2. The chain is attached to the angle support 38. It is self-contained. The region of the chain 47 that is opposite the attachment point hangs freely in the guiding rail 30 or can be guided in said guiding rail by the carrier rollers.

For automatic threading of the forward ends 28 of the strands, said ends are grasped by the two clamping rollers 41 and 42 in position A and clamped, whereupon the gripping device 21 is guided into position B, where the clamping of the strands 1 is eliminated, as described above. The strands 1 can then travel into the granulator 4 and are pelletized by it. During the pelletizing operation, the gripping device 21 remains in position B or the adjacent position C (opened clamping rollers 41 and 42), since in this position the gripping device 21 does not interfere with the course of the strands 1. If then for some reason it is necessary to start the device again, the gripping device 21 is moved into position A by means of the drive motor 29, whereupon then the device is started up and the forward ends 28 of the strands are taken over in the manner described above and thus a new pelletizing operation starts.

We claim:

1. A device for cooling and granulating molten thermoplastic strands (1) which emerge from dies (2) comprising:
    a precooling device (5) for receiving the strands from the dies and guiding the strands to an end of said precooling device remote from the dies (2);
    a coolant bath (9) provided with guide rollers (11, 12) which are arranged to direct the strands (1) received from the precooling device (5) along a predetermined path through said coolant bath (9);
    a granulator (4) which receives the strands (1) from the coolant bath (9); and
    a gripping device (21) with opposed clamping elements (41, 42) which open and shut to grip and release forward ends (28) of the strands (1), and a guide rail (20, 30) which extends between said end of said precooling device and said granulator (4), wherein said clamping elements (41, 42) are operated to grip the forward ends of the strands (1) at said end of said precooling device, move along said guide rail (20, 30) with the gripped strands to said granulator (9), and to release the forward ends (28) of the strands (1) into said granulator (9).

2. A device as claimed in claim 1, wherein said precooling device (5) is movable between a first position wherein the strands drop along a falling line beyond said precooling device (5) and a second position wherein the strands are received by said precooling device (5).

3. A device as claimed in claim 2, wherein said device further includes a separator (22) which separates the strands which drop along a falling line from the strands which are received by the precooling device such that the forward ends of the strands are initially received by said precooling device (5).

4. A device as claimed in claim 3, wherein said device further includes a carriage device (25) for guiding the movement of said precooling device (5), and wherein said separator (22) is attached to said precooling device (5) for movement therewith.

5. A device as claimed in claim 1, wherein the guide rail (30) has an end in front of an inlet of the granulator, and wherein the clamping elements (41, 42) of the gripping device (21) are rotated at said end of said guide rail to feed the strands (1) forward until the strands (1) are grasped by the granulator (4).

6. A device as claimed in claim 1, wherein the precooling device is designed as a discharge channel (5), which is fed with a coolant and which is arranged underneath the dies (2) to catch the strands (1).

7. A device as claimed in any one of the claims 1, 2, 3, 4, 5 and 6, wherein the guide rail (20) runs through the coolant bath (9) and around the guide rollers (11, 12).

8. A device as claimed in any one of the claims 1, 2, 3, 4, 5 and 6, wherein the guide rollers (31, 32) are movable in such a manner that they may be lifted out of the coolant bath (9) to an elevated position and lowered into said bath to a lowered position, and wherein the guide rail (30) runs between said coolant bath (9) and the elevated position of the guide rollers (31, 32), whereby, after the gripping device (21) has reached the granulator (4), the guide rollers (31, 32) are moved into the lowered position.

* * * * *